US012587720B2

(12) United States Patent     (10) Patent No.:   US 12,587,720 B2
Tocalini et al.     (45) Date of Patent:   Mar. 24, 2026

(54) MEDIA DEVICE SIMULATOR

(71) Applicant: ROKU, INC., San Jose, CA (US)

(72) Inventors: Rodrigo Emiliano Tocalini, Sunnyvale, CA (US); Andrey Marsavin, San Jose, CA (US); Govind Vaidya, San Ramon, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/200,299

(22) Filed: May 22, 2023

(65) Prior Publication Data

US 2024/0397168 A1    Nov. 28, 2024

(51) Int. Cl.

| | |
|---|---|
| *H04L 43/55* | (2022.01) |
| *H04L 65/612* | (2022.01) |
| *H04L 65/65* | (2022.01) |
| *H04L 65/75* | (2022.01) |
| *H04N 21/845* | (2011.01) |

(52) U.S. Cl.
CPC .......... *H04N 21/845* (2013.01); *H04L 43/55* (2022.05); *H04L 65/612* (2022.05); *H04L 65/65* (2022.05); *H04L 65/75* (2022.05)

(58) Field of Classification Search
CPC ....... H04L 43/55; H04L 65/612; H04L 65/75; H04L 65/65
See application file for complete search history.

(56) References Cited

U.S. PATENT DOCUMENTS

| | | | | |
|---|---|---|---|---|
| 11,412,283 B1* | 8/2022 | Kwong | ................. | G06N 20/00 |
| 11,616,993 B1* | 3/2023 | Chen | ............... | H04N 21/23418 |
| | | | | 725/146 |
| 2013/0084991 A1* | 4/2013 | LeMay | .............. | G07F 17/3206 |
| | | | | 463/42 |
| 2015/0229695 A1* | 8/2015 | Kim | ........................ | H04L 65/70 |
| | | | | 709/219 |
| 2019/0373036 A1* | 12/2019 | Howard | ............. | H04N 21/4621 |
| 2020/0099733 A1* | 3/2020 | Chu | .................... | H04N 21/8456 |
| 2020/0322663 A1* | 10/2020 | Vaderna | ................ | H04L 47/263 |
| 2020/0412752 A1* | 12/2020 | Shapoury | ............ | H04L 63/1433 |
| 2022/0141513 A1* | 5/2022 | Dai | ....................... | G06F 18/214 |
| | | | | 709/231 |

(Continued)

*Primary Examiner* — William G Trost, IV
*Assistant Examiner* — Adam A Cooney
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for evaluating bitrate selection models. An example embodiment operates by aggregating data associated with a data streaming session comprising a plurality of segments. The embodiment then determines, for each segment of the plurality of segments, segment data comprising streaming parameters by analyzing the aggregated data. The embodiment then generates a simulation input based on the segment data for each segment. The embodiment then performs a first simulation, based at least on the segment data for each segment and a first bitrate selection model, to simulate streaming each segment. The embodiment then generates a first simulation result for each segment. The embodiment then aggregates each first simulation result to provide a first aggregate simulation result of the data streaming session.

20 Claims, 5 Drawing Sheets

300

(56) References Cited

U.S. PATENT DOCUMENTS

| | | | |
|---|---|---|---|
| 2022/0150560 A1* | 5/2022 | Kasal | H04N 21/44209 |
| 2022/0191592 A1* | 6/2022 | Gairuboina | H04N 21/44209 |
| 2022/0221615 A1* | 7/2022 | Shi | E21B 44/02 |
| 2022/0303331 A1* | 9/2022 | Svennebring | H04N 21/44209 |
| 2023/0061526 A1* | 3/2023 | Aguilar-Armijo | H04L 65/612 |
| 2023/0344740 A1* | 10/2023 | Peng | H04L 41/5003 |
| 2024/0348852 A1* | 10/2024 | Karagioules | H04N 21/2387 |

* cited by examiner

MEDIA DEVICE 106

STREAMING MODULE 202

PROCESSING MODULE 204

USER INTERFACE MODULE 206

AUDIO COMMAND PROCESSING MODULE 216

AUDIO DECODER(S) 212

VIDEO DECODER(S) 214

STORAGE/BUFFERS 208

300

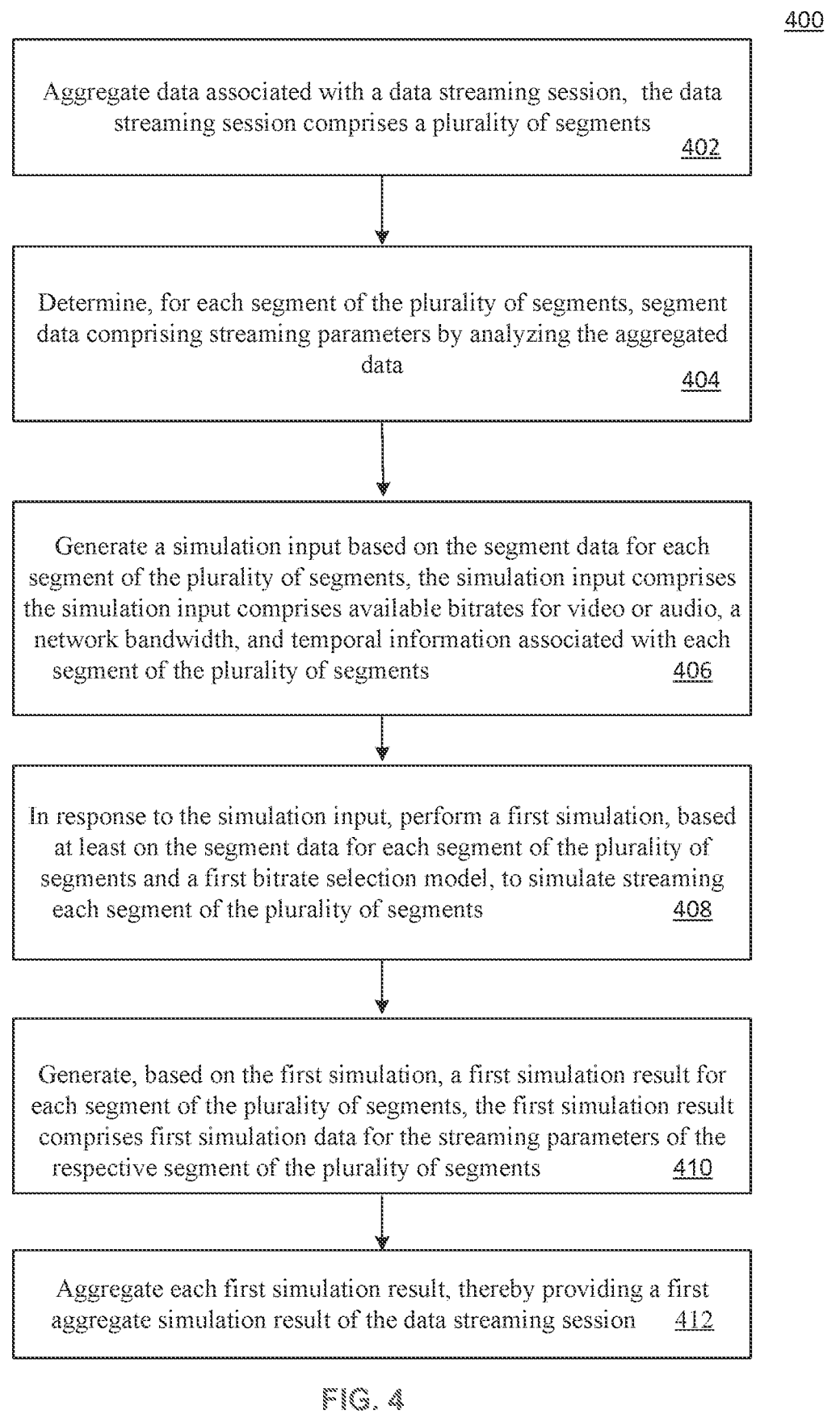

400

Aggregate data associated with a data streaming session, the data streaming session comprises a plurality of segments
402

Determine, for each segment of the plurality of segments, segment data comprising streaming parameters by analyzing the aggregated data
404

Generate a simulation input based on the segment data for each segment of the plurality of segments, the simulation input comprises the simulation input comprises available bitrates for video or audio, a network bandwidth, and temporal information associated with each segment of the plurality of segments
406

In response to the simulation input, perform a first simulation, based at least on the segment data for each segment of the plurality of segments and a first bitrate selection model, to simulate streaming each segment of the plurality of segments
408

Generate, based on the first simulation, a first simulation result for each segment of the plurality of segments, the first simulation result comprises first simulation data for the streaming parameters of the respective segment of the plurality of segments
410

Aggregate each first simulation result, thereby providing a first aggregate simulation result of the data streaming session    412

FIG. 4

MEDIA DEVICE SIMULATOR

BACKGROUND

Field

This disclosure is generally directed to data streaming technology, and more particularly to perform a media device simulation for data streaming.

Background

Adaptive bitrate streaming (ABR or ABS) is a technique used in streaming data over computer networks. Adaptive streaming technologies are currently based on, but not limited to, Hypertext Transfer Protocol (HTTP). Adaptive bitrate streaming may be performed at varying levels of qualities and associated bitrates or speed. An adaptive bitrate selection in adaptive bitrate streaming may be implemented by one or more bitrate selection algorithms or models to select a bitrate for data downloads. However, evaluating the bitrate selection algorithms or models used to adaptively select the bitrate of the streams can be challenging. Evaluating the bitrate selection algorithms or models may often be computationally expensive or require much memory usage. For example, copious amounts of content may need to be streamed for the evaluation. In addition, data on the streaming sessions may need to be gathered for the evaluation to determine if there is an improvement in the collective streaming experiences.

SUMMARY

Provided herein are system, apparatus, article of manufacture, method and/or computer program product embodiments, and/or combinations and sub-combinations thereof, for evaluating bitrate selection models. The technology as described herein, in some embodiments, may be configured to collect information on how to improve a streaming experience. In some embodiments, the technology may be applied broadly to any configurable aspect of performing a simulation for data streaming.

An example embodiment operates by a computer-implemented method for evaluating bitrate selection models. The method includes aggregating, by a media device simulation system, data associated with a data streaming session. The data streaming session comprises a plurality of segments. The method further includes determining, for each segment of the plurality of segments, segment data comprising streaming parameters by analyzing the aggregated data. The method further includes generating a simulation input based on the segment data for each segment of the plurality of segments. The simulation input comprises available bitrates for video or audio, a network bandwidth and temporal information each segment of the plurality of segments. The method further includes, in response to the simulation input, performing a first simulation, based at least on the segment data for each segment of the plurality of segments and a first bitrate selection model, to simulate streaming each segment of the plurality of segments. The method further includes generating, based on the first simulation, a first simulation result for each segment of the plurality of segments. Each first simulation result comprises first simulation data for the streaming parameters of the respective segment of the plurality of segments. The method further includes aggregating each first simulation result, thereby providing a first aggregate simulation result of the data streaming session.

In some embodiments, the determining, for each segment of the plurality of segments, segment data can include preprocessing the aggregated data.

In some embodiments, the method can further include, in response to the simulation input, performing a second simulation, based at least on the segment data for each segment of the plurality of segments and a second bitrate selection model, to simulate streaming each segment of the plurality of segments. The second bitrate selection model can be different from the first bitrate selection model. The method can further include generating, based on the second simulation, a second simulation result for each segment of the plurality of segments. The second simulation result can include second simulation data for the streaming parameters of the respective segment of the plurality of segments. The method can further include aggregating each second simulation result, thereby providing a second aggregate simulation result of the data streaming session. The method can further include comparing the first aggregate simulation result and the second aggregate simulation result. The method can further include based on the comparison, selecting the first bitrate selection model to perform data streaming from a data streaming source.

In some embodiments, each of the streaming parameters can include parameters associated with temporal information, network or device conditions, or segment information.

In some embodiments, the performing the first simulation can include refraining from performing data streaming or downloading.

In some embodiments, the performing the first simulation can include providing the available bitrates for video or audio, the network bandwidth and a streaming state associated with each segment of the plurality of segments to the first bitrate selection model; and selecting a video or audio bitrate by the first bitrate selection model for each segment of the plurality of segments.

In some embodiments, the performing the first simulation can include monitoring the first simulation data for the streaming parameters during the first simulation.

An example embodiment operates by a system that includes at least one processor configured to perform operations including aggregating data associated with a data streaming session. The data streaming session comprises a plurality of segments. The operations further include determining, for each segment of the plurality of segments, segment data comprising streaming parameters by analyzing the aggregated data. The operations further include generating a simulation input based on the segment data for each segment of the plurality of segments. The simulation input comprises available bitrates for video or audio, a network bandwidth and temporal information each segment of the plurality of segments. The operations further include, in response to the simulation input, performing a first simulation, based at least on the segment data for each segment of the plurality of segments and a first bitrate selection model, to simulate streaming each segment of the plurality of segments. The operations further include generating, based on the first simulation, a first simulation result for each segment of the plurality of segments. Each first simulation result comprises first simulation data for the streaming parameters of the respective segment of the plurality of segments. The operations further include aggregating each first simulation result, thereby providing a first aggregate simulation result of the data streaming session.

In some embodiments, the operation of the determining, for each segment of the plurality of segments, segment data can include preprocessing the aggregated data.

In some embodiments, the operations can further include, in response to the simulation input, performing a second simulation, based at least on the segment data for each segment of the plurality of segments and a second bitrate selection model, to simulate streaming each segment of the plurality of segments. The second bitrate selection model can be different from the first bitrate selection model. The operations can further include generating, based on the second simulation, a second simulation result for each segment of the plurality of segments. The second simulation result can include second simulation data for the streaming parameters of the respective segment of the plurality of segments. The operations can further include aggregating each second simulation result, thereby providing a second aggregate simulation result of the data streaming session. The operations can further include comparing the first aggregate simulation result and the second aggregate simulation result. The operations can further include based on the comparison, selecting the first bitrate selection model to perform data streaming from a data streaming source.

In some embodiments, each of the streaming parameters can include parameters associated with temporal information, network or device conditions, or segment information.

In some embodiments, the operation of the performing the first simulation can include refraining from performing data streaming or downloading.

In some embodiments, the operation of the performing the first simulation can include providing the available bitrates for video or audio, the network bandwidth and a streaming state associated with each segment of the plurality of segments to the first bitrate selection model; and selecting a video or audio bitrate by the first bitrate selection model for each segment of the plurality of segments.

In some embodiments, the operation of the performing the first simulation can include monitoring the first simulation data for the streaming parameters during the first simulation.

An example embodiment operates by a non-transitory computer-readable medium having instructions stored thereon that, when executed by at least one computing device, cause the at least one computing device perform operations that include aggregating data associated with a data streaming session. The data streaming session comprises a plurality of segments. The operations further include determining, for each segment of the plurality of segments, segment data comprising streaming parameters by analyzing the aggregated data. The operations further include generating a simulation input based on the segment data for each segment of the plurality of segments. The simulation input comprises available bitrates for video or audio, a network bandwidth and temporal information each segment of the plurality of segments. The operations further include, in response to the simulation input, performing a first simulation, based at least on the segment data for each segment of the plurality of segments and a first bitrate selection model, to simulate streaming each segment of the plurality of segments. The operations further include generating, based on the first simulation, a first simulation result for each segment of the plurality of segments. Each first simulation result comprises first simulation data for the streaming parameters of the respective segment of the plurality of segments. The operations further include aggregating each first simulation result, thereby providing a first aggregate simulation result of the data streaming session.

In some embodiments, the operation of the determining, for each segment of the plurality of segments, segment data can include preprocessing the aggregated data.

In some embodiments, the operations can further include, in response to the simulation input, performing a second simulation, based at least on the segment data for each segment of the plurality of segments and a second bitrate selection model, to simulate streaming each segment of the plurality of segments. The second bitrate selection model can be different from the first bitrate selection model. The operations can further include generating, based on the second simulation, a second simulation result for each segment of the plurality of segments. The second simulation result can include second simulation data for the streaming parameters of the respective segment of the plurality of segments. The operations can further include aggregating each second simulation result, thereby providing a second aggregate simulation result of the data streaming session. The operations can further include comparing the first aggregate simulation result and the second aggregate simulation result. The operations can further include based on the comparison, selecting the first bitrate selection model to perform data streaming from a data streaming source.

In some embodiments, each of the streaming parameters can include parameters associated with temporal information, network or device conditions, or segment information.

In some embodiments, the operation of the performing the first simulation can include refraining from performing data streaming or downloading.

In some embodiments, the operation of the performing the first simulation can include providing the available bitrates for video or audio, the network bandwidth and a streaming state associated with each segment of the plurality of segments to the first bitrate selection model; and selecting a video or audio bitrate by the first bitrate selection model for each segment of the plurality of segments.

In some embodiments, the operation of the performing the first simulation can include monitoring the first simulation data for the streaming parameters during the first simulation.

BRIEF DESCRIPTION OF THE FIGURES

The accompanying drawings are incorporated herein and form a part of the specification.

FIG. 4 illustrates a process diagram of media device simulation, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
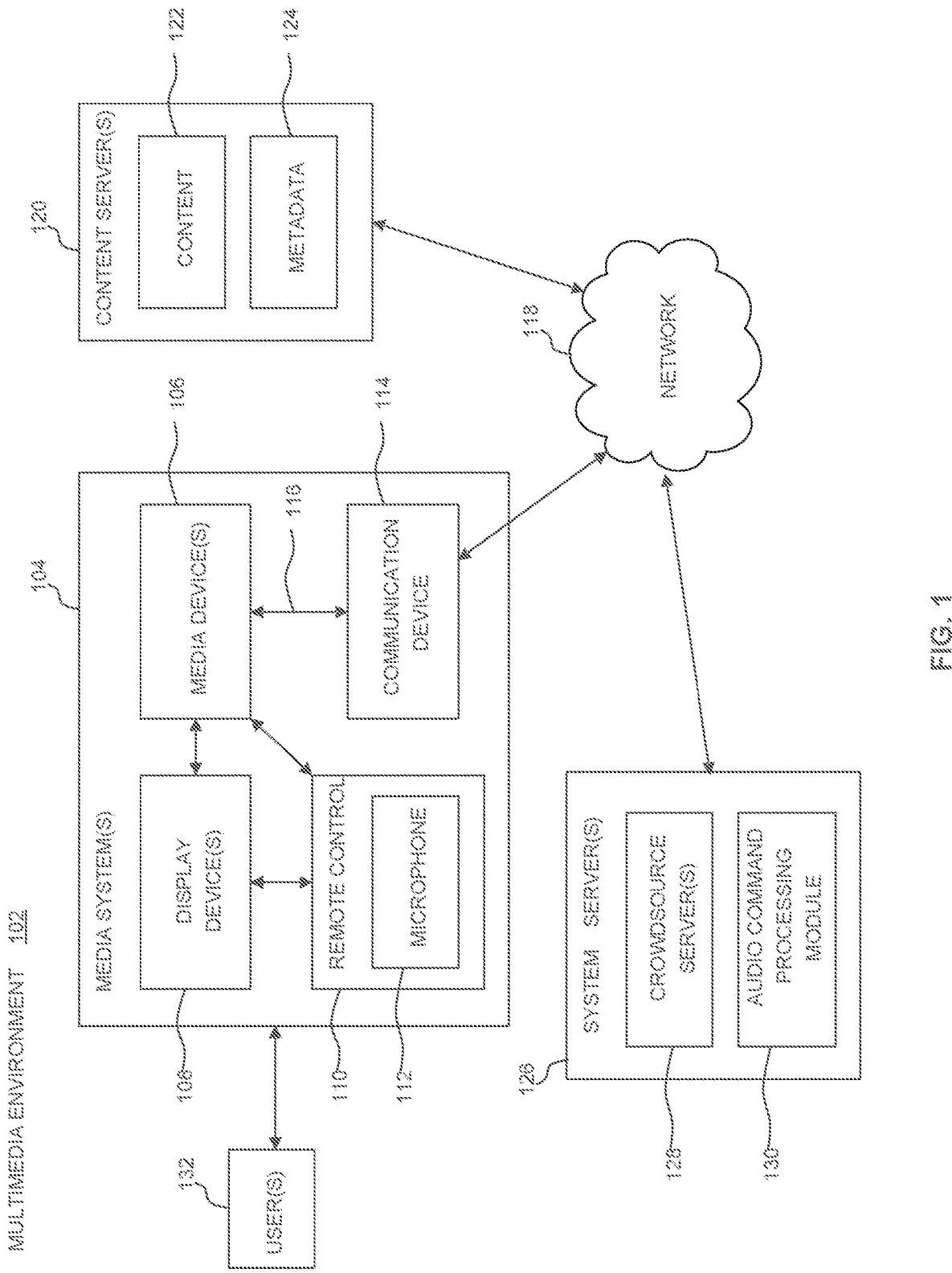
FIG. 1 illustrates a block diagram of a multimedia environment, according to some embodiments.

Provided herein are system, apparatus, article of manufacture, method and/or computer program product embodiments, and/or combinations and sub-combinations thereof, for performing a media device simulation for data streaming.

As described above, Adaptive bitrate streaming (ABR or ABS) is a technique used in streaming multimedia over computer networks. Adaptive streaming technologies are currently based on, but not limited to, Hypertext Transfer Protocol (HTTP). Adaptive bitrate streaming may be performed at varying levels of qualities and associated bitrates or speed. An adaptive bitrate selection in adaptive bitrate streaming may be implemented by one or more bitrate selection algorithms or models to select a bitrate for data downloads. However, evaluating the bitrate selection algorithms or models used to adaptively select the bitrate of the streams can be challenging. Evaluating the bitrate selection algorithms or models may often be computationally expensive or require much memory usage. For example, copious amounts of content may need to be streamed for the evaluation. In addition, data on the streaming sessions may need to be gathered for the evaluation to determine if there is an improvement in the collective streaming experiences.

In some aspects, the technology described herein may implement a media device simulation for data streaming to improve a streaming experience. For example, data associated with a data streaming session can be aggregated. The data streaming session can include multiple segments. Segment data comprising streaming parameters can be determined for each of the segments by analyzing the aggregated data. A simulation input can be generated based on the segment data for each of the segments. The simulation input can include available bitrates for video or audio, a network bandwidth, and temporal information associated with each segment of the plurality of segments. In response to the simulation input, a simulation can be performed based at least on the segment data for each of the segments and a bitrate selection model, to simulate streaming the segment data for each of the segments. A simulation result for each of the segments can be generated, thereby providing an aggregate simulation result of the data streaming session.

In some aspects, the technology described herein can collect data on streaming sessions streamed by a media device and use the collected data to simulate the streaming sessions with a different adaptive bitrate selection algorithm than used in the streaming sessions. Different adaptive streaming algorithms may be compared, measured and evaluated based on the same streaming sessions. Different adaptive streaming algorithms may be evaluated, using the same common metrics, to determine whether a change of adaptive streaming algorithms may provide an improvement on the streaming experience, without performing any actual content streaming.

In some aspects, the technology described herein may perform the media device simulation augmented by or based on real data in the streaming sessions. In addition, or alternatively, the technology described herein may use the minimal amount of data needed to correctly simulate the environment for streaming. In one example, streaming metrics, such as rebuffer (i.e., empty buffer) rate/ratio, and average quality of stream, may be used to evaluate the bitrate selection algorithms or models used to adaptively select the bitrate of the streams. Based on the evaluation, a bitrate selection algorithm or model may be selected for data streaming to improve a streaming experience.

In some aspects, the technology described herein may provide an inexpensive and easy solution to evaluate any changes in adaptive bitrate selection algorithms. The technology described herein may provide a better accuracy than other simulation approaches. Issues that cause the algorithms to perform worse in reality than in simulation, such as over-fitting of algorithms, may be prevented.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, touch screen, smart phone, tablet, wearable (such as a watch or glasses), virtual reality (VR) headset, appliance, internet of things (IoT) device, automotive display, gaming display, heads-up display (HUD), and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming's of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
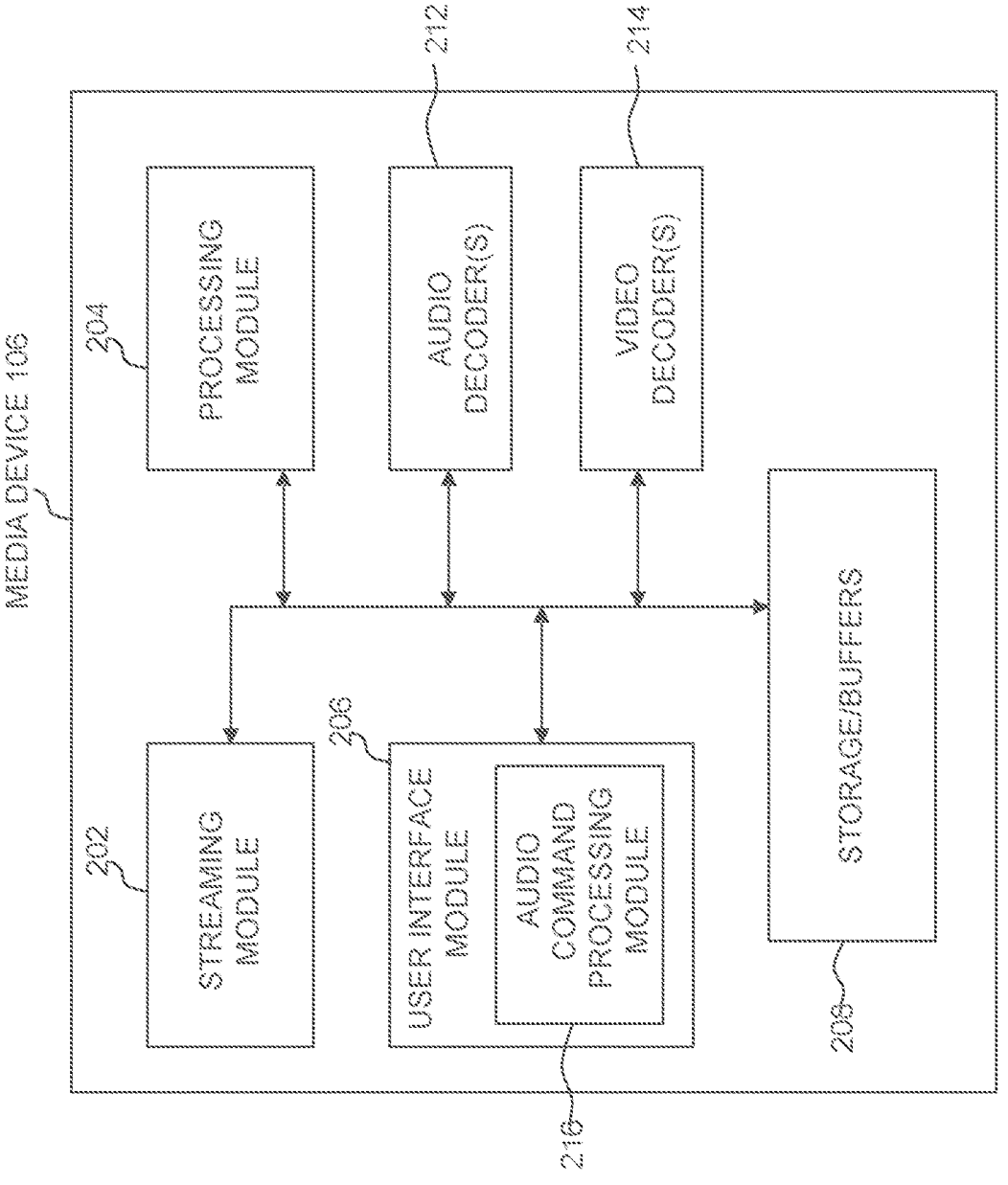
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG, GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Media Device Simulation

The technology as described herein, in some embodiments, may be configured to perform a media device simulation for data streaming. In these embodiments, the technology may be applied broadly to any configurable aspect of performing a media device simulation process.

In some aspects, media content may be streamed over one or more networks so that a device does not have to download an entire video file before playing it. In some aspects, media content may be streamed over computer networks by using an adaptive streaming technology, such as for example, Dynamic Adaptive Streaming over HTTP (DASH) technology, where media content is partitioned into one or more segments and delivered to a client using HTTP. More specifically, source content may be encoded at multiple bitrates. Each of the different bitrate streams may be segmented into small multi-second parts (e.g., chunks or segments). The segment size may vary depending on the particular implementation, but they are commonly between two and ten seconds. In some aspects, data segments may be pre-loaded for streaming video content. The data segments may be preloaded into a reserved section of memory, for example, a buffer. A streaming device may buffer a media content, such as a video, because the video may normally be downloaded faster than the speed at which the video plays.

In some aspects, an adaptive bitrate model in the client (e.g., media device 106) may, in some embodiments, perform the function of deciding the video or audio bitrate to download the segments, based on the various parameters, such as, but not limited to, current buffer level, current and past network speeds, history of rebuffers, time of day, region of client, content delivery network (CDN), network connection type (wired, WiFi, mobile), client hardware platform, WiFi performance, central processing unit (CPU) performance, decryption performance, content encoding/decoding, packaging, etc. Throughout the descriptions, the terms speed, bitrate and bandwidth may be used interchangeably.

In various embodiments, the technology described herein implements a system, apparatus, article of manufacture, method and/or computer program product embodiments, and/or combinations and sub-combinations thereof, for performing a media device simulation to simulate a media device (e.g., media device 106) to evaluate different bitrate selection models. In some aspects, a computing system or device can collect data on streaming sessions streamed by a media device (e.g., media device 106) and use the collected data to simulate the streaming sessions with a different adaptive bitrate selection algorithm, such as a first bitrate selection model, than used in the streaming sessions. For example, the computing system or device can simulate the operations performed by the media device and provide a first simulation result based on the collected data and the first bitrate selection model. The computing system or device can generate, based on the first simulation, a first simulation result. In some aspects, the computing system or device use the collected data to simulate the streaming sessions with a second bitrate selection model different from the first bitrate selection model. For example, the computing system or device can simulate the operations performed by the media device and provide a second simulation result based on the collected data and the second bitrate selection model. The computing system or device can generate, based on the second simulation, a second simulation result.

In some aspects, the computing system or device can compare the first aggregate simulation result and the second aggregate simulation result to determine a difference in performance for the first bitrate selection model and the second bitrate selection model. Based on the comparison, the first bitrate selection model can be selected based on an improvement on performance compared with the second bitrate selection model. The first bitrate selection model can be selected for data streaming to improve a streaming experience. In some aspects, media device 106 may perform data streaming by using the first bitrate selection model.

Figure 3:
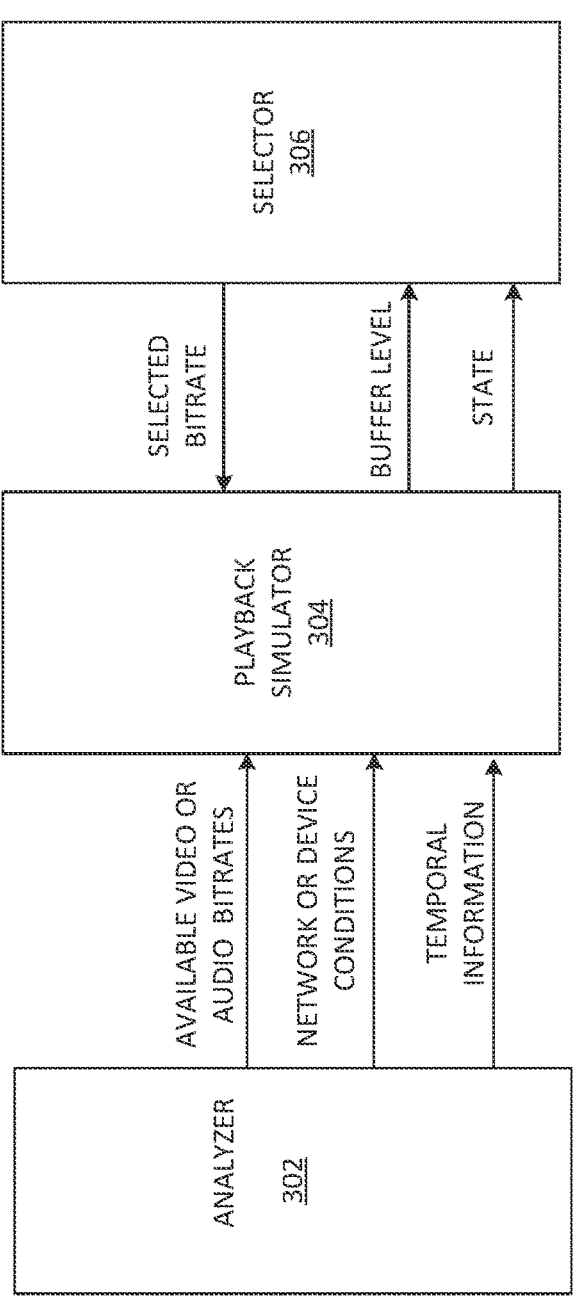
FIG. 3 illustrates a block diagram of a media device simulation system, according to some embodiments.

FIG. 3 illustrates a block diagram of a media device simulation system 300, according to some embodiments. Media device simulation may be implemented by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps described may be performed simultaneously, or in a different order than described for FIG. 3, as will be understood by a person of ordinary skill in the art.

Media device simulation system 300 can include or be part of a server, a media system, an Internet of Things (IoT) system and/or any other computing systems. For example, referring to FIGS. 1-2, media system 104, system server 126, or any other computer processor (not shown in FIGS. 1-2) may be configured with media device simulation or processing elements.

As shown in FIG. 3, media device simulation system 300 can be configured with three major modules: analyzer module 302, playback simulator module 304 and selector module 306. Each of these modules may be implemented by processing logic that can comprise hardware (e.g., circuitry, dedicated logic, programmable logic, microcode, etc.), software (e.g., instructions executing on a processing device), or a combination thereof.

In some aspects, analyzer module 302 can receive data collected in a streaming session streamed by a media device (e.g., media device 106). As described above, in the streaming session, each of the streams may be segmented into small multi-second parts (chunks or segments). In some examples, data may be logged for each segment during data streaming in the streaming session.

In some aspects, analyzer module 302 can determine, from the collected data, segment data of streaming parameters for each of the segments. The streaming parameters may include parameters associated with temporal information, network or device conditions, segment information, and/or other information.

In some aspects, temporal information may include a time period associated with a state, such as startup, playing, pausing or buffering of media device 106, in the streaming session. In some examples, temporal information may include a specific time when certain events occur, such as when a segment was aborted or rebuffered.

In some aspects, network or device conditions may include a network bandwidth, such as measured network bandwidth (e.g., average download speed) associated with each of the segments. Bandwidth may refer to the rate of data transfer, bitrate or data throughput. In some examples, network or device conditions may include temporal information (e.g., specific time) associated with the downloading a segment. For example, temporal information associated with the downloading the segment may include a time period for the first byte in the segment to be downloaded.

In some examples, network or device conditions may include device, platform, or system information associated with the media device to be simulated (e.g., media device 106). In some examples, network or device conditions may include a buffer level, such as immediately available for playback in storage/buffers 208. The buffer level may include an audio buffer level or a video buffer level associated with media device 106. In some examples, device conditions may include an amount of memory available associated with media device 106 or maximum display resolution on display device 108. For example, network conditions may include an IP address of a server (e.g., content server 120) serving a previously downloaded segment to media device 106.

In some aspects, segment information may include selectable video or audio bitrates. The selectable video or audio bitrates may include manifest bitrates in one or more manifest files associated with the streaming session. The selectable video or audio bitrates may include available video or audio bitrates (e.g., highest and/or lowest) that can be selected, for example by an adaptive bitrate selection algorithm, for each segment. In some examples, segment information may include a selected video or audio bitrate, from the selectable video or audio bitrates, for each segment. In some examples, segment information may include temporal information, such as a specific time or time period associated with selecting a video or audio bitrate for the segment.

In some examples, segment information may include an actual video or audio bitrate of the segment during data streaming, which may be different from the selectable video or audio bitrates. In some examples, segment information may include a predicted download speed of the segment. In some examples, segment information may include a duration of each segment in the streaming session. In some examples, segment information may include a duration of each segment measured at the end of the downloading.

In some aspects, the streaming parameters may include parameters such as a unique identifier for the streaming session, an occurrence of the streaming session (e.g., log count), an identifier of the channel associated with the streaming session, an event type (e.g., live streaming or video on demand) associated with the streaming session, and/or a format associated with video or audio data.

In some aspects, analyzer module 302 can output the segment data of streaming parameters associated with each of the segments to playback simulator 304. In some examples, analyzer module 302 can preprocess the segment data of streaming parameters associated with each of the segments, prior to outputting to playback simulator 304. For example, analyzer module 302 may presort the segment data of streaming parameters by occurrences and separate the segment data of streaming parameters by the identifier for the streaming session. Analyzer module 302 may encode the segment data of streaming parameters to reduce computation time and further processing.

In some aspects, playback simulator module 304 can perform a media device simulation by simulating one or more operations of media device 106 during the data streaming session, without streaming or downloading any actual content. In some examples, the one or more operations of media device 106 during the data streaming session may be described as below. For example, media device 106 may store the content received from content server(s) 120 in storage/buffers 208 for later playback. Media device 106 may transmit the received content to one or more audio decoders 212 and/or one or more video decoders 214. Media device 106 may determine whether there is data available associated with the one or more audio decoders 212 and/or one or more video decoders 214. Based on the determination, media device 106 may be configured to playback data in a video or audio buffer, such as in storage/buffers 208, or rebuffer.

In some aspects, playback simulator module 304 can perform the media device simulation based on a simulation input. The simulation input may include available bitrates for video or audio, a network bandwidth and temporal information associated with each of the segments, received from analyzer module 302. In some examples, the temporal information in the simulation input may not include temporal information associated with a streaming discontinuity. For example, the streaming discontinuity can include an event of a rebuffer, an event of pausing or seeking, an event of gap compensation, an event of an interruption on the data (e.g., advertisement) or bad data.

In some aspects, based on the simulation input, playback simulator module 304 can send the available bitrates for video or audio, the network bandwidth, a streaming state, a video or audio buffer level associated with each of the segments to selector module 306.

In some examples, selector module 306 can include a bitrate selection model, such as an adaptive bitrate model. As described above, an adaptive bitrate model in the client (e.g., media device 106) may, in some embodiments, perform the function of deciding the video or audio bitrate to download the segments, based on the various parameters. For example, the adaptive bitrate model may decide the video bitrate from the available bitrates for video. The adaptive bitrate model may decide the audio bitrate from the available bitrates for audio.

In some aspects, the adaptive bitrate model may include one or more machine learning models. Machine learning includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. In some examples, unsupervised learning may carry some technical advantages of flexibility compared to supervised learning.

In one non-limiting example, the adaptive bitrate model may include a machine learning speed model, based on supervised training using logs of current known selection algorithms. The machine learning speed model may predict a download speed based on a random forest decision tree based classifier that predicts a sustainable bitrate for streaming (bandwidth). In another non-limiting example, the adaptive bitrate model may include a machine learning rebuffer model, based on supervised training. The machine learning rebuffer model may determine a download bitrate based on a forest decision tree based classifier that predicts if a rebuffer (i.e., empty buffer) will occur given a candidate bitrate for streaming and current playback rate. In another non-limiting example, the adaptive bitrate model may include a hybrid system including a machine learning speed model and a machine learning rebuffer model. For example, the speed model, based on supervised training, may predict a future download speed (e.g., bitrate). This bitrate candidate may then be fed to the rebuffer model to further predict if a rebuffer (e.g., empty buffer) will occur given the selected bitrate.

Alternatively or in addition, the adaptive bitrate model may include one or more models that are not based on machine learning models. In some aspects, the adaptive bitrate model may include one or more models to select a video or audio bitrate based on the available bitrates for video or audio, the network bandwidth, a streaming state, a video or audio buffer level associated with each of the segments from analyzer 302. In some aspects, the adaptive bitrate model may select a lowest, a highlight, or a random selectable video or audio bitrate.

In some aspects, selector module 306 can select a video or audio bitrate associated with each of the segments. Selector module 306 can send the selected video or audio bitrate associated with each of the segments to playback simulator module 304.

In some aspects, playback simulator module 304 can receive the selected video or audio bitrate associated with each of the segments from selector module 306, and simulate the one or more operations of media device 106 for each of the segments during the data streaming session. Playback simulator module 304 can simulate the one or more operations based on the segment data for each of the segments, from analyzer module 302. For example, playback simulator module 304 may simulate the one or more operations based on the segment data associated with temporal information, network or device conditions, and/or segment information and other information, as described above. In some aspects, playback simulator module 304 may replay or resemble one or more conditions in the segment data received from analyzer module 302.

In some aspects, during the media device simulation, playback simulator module 304 can monitor or track simulation data for the streaming parameters associated with each of the segments. For example, playback simulator module 304 may monitor or track time spent in one or more simulated streaming state, such as a simulated startup, playing, pausing or buffering of playback simulator module 304. Playback simulator module 304 may monitor or track selected bitrates for each segment, and/or duration of each segment. Playback simulator module 304 may monitor or track simulated data associated with one or more simulated rebuffers, such as an amount, simulated rebuffer rates or ratio, and/or a type of the simulated rebuffer. Playback simulator module 304 may monitor or track a simulated Quality of Experience (QoE), drops and/or gaps associated with each of the segments during simulation.

In some aspects, playback simulator module 304 can generate a simulation result for each of the segments. The simulation result may include, for example, the monitored or tracked simulation data for the streaming parameters associated with each of the segments, as described above.

In some aspects, playback simulator module 304 may generate a first simulation result for each of the segments, based on a first adaptive bitrate model in selector module 306 and the analyzed data from analyzer module 302. Alternatively or in addition, playback simulator module 304 may generate a second simulation result for each of the segments, based on a second adaptive bitrate model in selector module 306 and the analyzed data from analyzer module 302. In some examples, the second adaptive bitrate model may be different from the first adaptive bitrate model. In some examples, selector module 306 may switch or select between the first adaptive bitrate model, the second adaptive bitrate model or any other adaptive bitrate models. In some aspects, media device simulation system 300 can aggregate each first simulation result, thereby providing a first aggregate simulation result of the data streaming session. In some aspects, media device simulation system 300 can aggregate each second simulation result, thereby providing a second aggregate simulation result of the data streaming session. In some aspects, the first aggregate simulation result and the second aggregate simulation result may be compared and evaluated to determine a performance of first adaptive bitrate model or second adaptive bitrate model.

FIG. 4 is a flowchart for a method 400 for performing a media device simulation, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIGS. 1-3. For example, method 400 may represent the operation of a media device simulation system (e.g., media device simulation 300 of FIG. 3). However, method 400 is not limited to that example embodiment.

In step 402, media device simulation system 300 aggregates data associated with a data streaming session. The data streaming session can include a plurality of segments. In some aspects, the data streaming session may be associated with data streaming by a media device (e.g., media device 106) from one or more data streaming sources (e.g., a channel or application). As described above, source content may be encoded at multiple bitrates. Each of the different bitrate streams are segmented into small multi-second parts (chunks or segments).

In step 404, media device simulation system 300 determines segment data for each of segments. The segment data can include streaming parameters by analyzing the aggregated data. The streaming parameters can include parameters associated with temporal information, network or device conditions, and/or segment information and other information, as described above with reference to FIG. 3. In some aspects, media device simulation system 300 may preprocess the aggregated data, prior to, during, or subsequent to the analyzing the data. In some aspects, media device simulation system 300 may determine the streaming parameters associated with each of the segments. In some aspects, media device simulation system 300 may extract, from the aggregated data, segment data for each of the segments.

In step 406, media device simulation system 300 generates a simulation input based on the segment data for each of the segments. The simulation input includes available bitrates for video or audio, a network bandwidth, and temporal information associated with each of the segments. As described above, in some examples, the available video or audio bitrates may include one or more manifest bitrates in one or more manifest files associated with the streaming session. In some aspects, the network bandwidth may include a measured network bandwidth (e.g., download speed) associated with each of the segments. In some aspects, temporal information may include a time period associated with a state, such as startup, playing, pausing or buffering of a media device associated with the data streaming session. In some examples, temporal information may include a specific time when certain events occur, such as when a segment was aborted or rebuffered. In some examples, the temporal information in the simulation input may not include temporal information associated with a streaming discontinuity. For example, the streaming discontinuity can include an event of a rebuffer, an event of pausing or seeking, an event of gap compensation, an event of an interruption on the data (e.g., advertisement) or bad data.

In step 408, in response to the simulation input, media device simulation system 300 performs a first simulation, based at least on the segment data for each of the segments and a first bitrate selection model, to simulate streaming each segment of the plurality of segments. In some aspects, media device simulation system 300 may refrain from performing data streaming or downloading. In some aspects, media device simulation system 300 may provide the available bitrates for video or audio, the network bandwidth and a streaming state associated with each segment of the plurality of segments to the first bitrate selection model. A first bitrate (e.g., video bitrate or audio bitrate) may be selected by the first bitrate selection model for each segment of the plurality of segments. As described above, the first bitrate selection model may include an adaptive bitrate model, such as including one or more machine learning models or models not based on machine learning. In some aspects, media device simulation system 300 may simulate one or more operations of the media device associated with the data streaming session, based on at least on the segment data and the first video or audio bitrate. In some aspects, during the simulation, media device simulation system 300 may monitor or track the first simulation data for the streaming parameters.

Alternatively or in addition, media device simulation system 300 can perform a second simulation, in response to the simulation input, based at least on the segment data for each of the segments and a second bitrate selection model, to simulate streaming each segment of the plurality of segments. In some aspects, the second bitrate selection model may be different from the first bitrate selection model. A second bitrate (e.g., video bitrate or audio bitrate) may be selected by the second bitrate selection model for each segment of the plurality of segments. As described above, the second bitrate selection model may include an adaptive bitrate model, such as including one or more machine learning models or models not based on machine learning. In some aspects, media device simulation system 300 may simulate one or more operations of the media device associated with the data streaming session, based on at least on the segment data and the second video or audio bitrate. In some aspects, during the second simulation, media device simulation system 300 may monitor or track the second simulation data for the streaming parameters.

In step 410, media device simulation system 300 generates, based on the first simulation, a first simulation result for each segment of the plurality of segments. The first simulation result can include first simulation data for the streaming parameters of the respective segment of the plurality of segments.

In step 412, media device simulation system 300 aggregates each first simulation result, thereby providing a first aggregate simulation result of the data streaming session.

In some examples, media device simulation system 300 can provide a first aggregate report, based on the first aggregate simulation result, for one or more data streaming sources (e.g., a channel or application). In some examples, the first aggregate report can include an amount of sessions simulated, simulation time, processing time, a simulated amount of rebuffers, selected bitrate and/or simulated actual bitrate for each data streaming source (e.g., a channel or application). In some examples, the first aggregate report can include a comparison of first simulation data associated with each data streaming source.

In some aspects, based on the second simulation, media device simulation system 300 can generate a second simulation result for each segment of the plurality of segments. The second simulation result can include second simulation data for the streaming parameters of the respective segment of the plurality of segments. Media device simulation system 300 can aggregate each first simulation result, thereby providing a second aggregate simulation result of the data streaming session.

In some examples, media device simulation system 300 may provide a second aggregate report, based on the second aggregate simulation result, for one or more data streaming sources (e.g., a channel or application). In some examples, the second aggregate report may include an amount of sessions simulated, simulation time, processing time, a simulated amount of rebuffers, selected bitrate and/or simulated actual bitrate for each data streaming source (e.g., a channel or application). In some examples, the second aggregate report may include a comparison of second simulation data associated with each data streaming source.

In some aspects, media device simulation system 300 can compare the first aggregate simulation result and the second aggregate simulation result to determine a difference in performance for the first bitrate selection model and the second bitrate selection model. The performance may be determined based on one or more simulated streaming metrics. In one example, the simulated streaming metrics, such as simulated rebuffer (i.e., empty buffer) amount, rate/ratio, and simulated average quality of stream, may be used to evaluate the first bitrate selection model and/or the second bitrate selection model used to adaptively select the bitrate of the streams. In some aspects, the first bitrate selection model and/or the second bitrate selection model may be evaluated based on the first simulation result, the second simulation result, the first aggregate simulation result, the second aggregate simulation result, the first aggregate report, and/or the second aggregate report.

Based on the comparison, the first bitrate selection model may be selected based on an improvement on performance compared with the second bitrate selection model. The first bitrate selection model may be selected for data streaming to improve a streaming experience. In some aspects, media device 106 may perform data streaming by using the first bitrate selection model.

In some aspects, the simulations that can be performed by the media device 300 may not be limited to the first simulation and the second simulation. The media device simulation system 300 can perform any number of the simulations, such as, different from the first simulation and the second simulation. For example, media device simulation system 300 can perform a third simulation based on a third bitrate selection model. The media device simulation system 300 can generate a third aggregate simulation result to evaluate a performance for the third bitrate selection model.

Example Computer System

Figure 5:
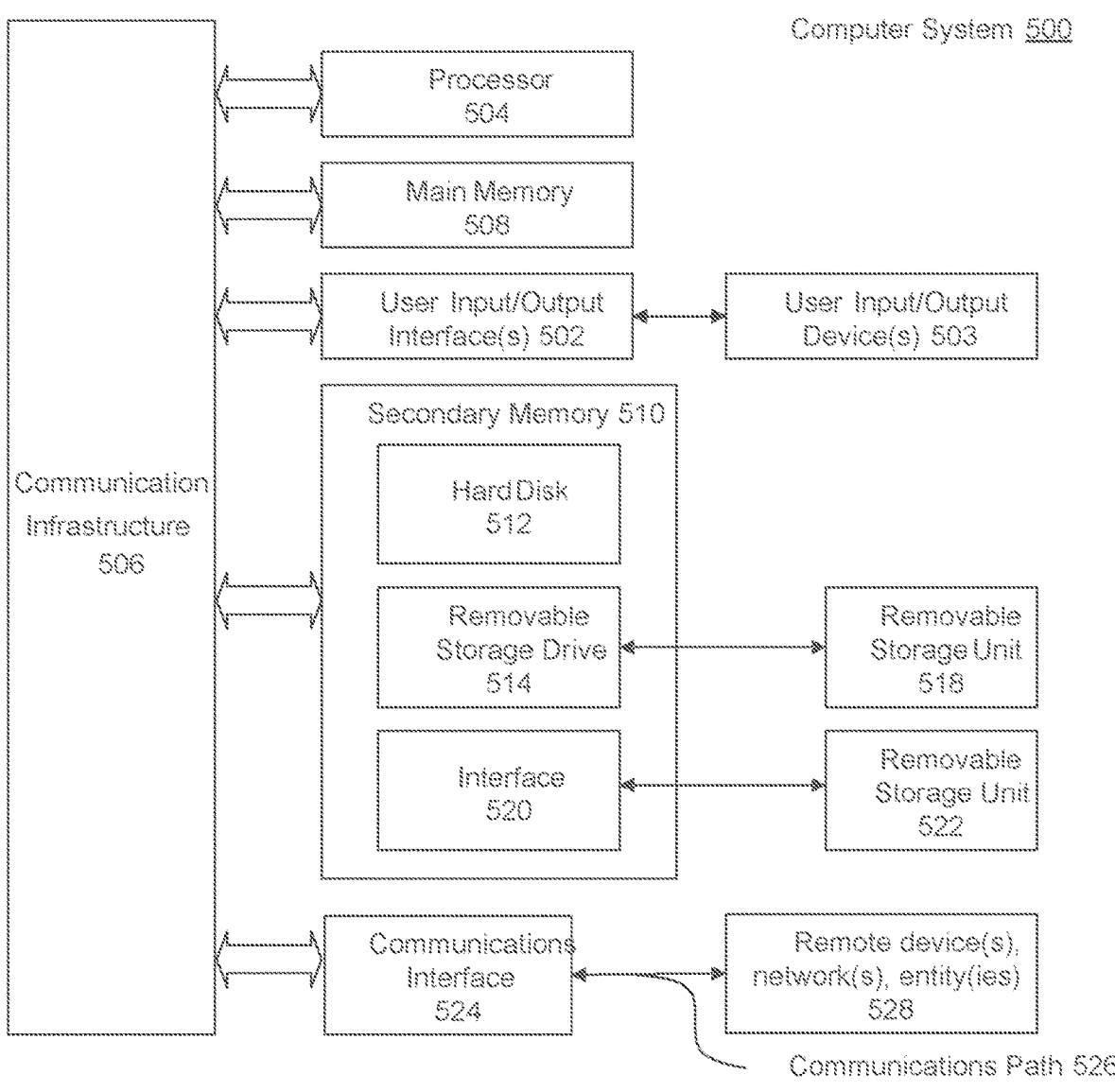
FIG. 5 illustrates an example computer system useful for implementing various embodiments.

Various embodiments may be implemented, for example, using one or more well-known computer systems, such as computer system 500 shown in FIG. 5. For example, media device simulation system 300 may be implemented using combinations or sub-combinations of computer system 500. Also or alternatively, media device simulation system 300 may be implemented using combinations or sub-combinations of computer system 500. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for evaluating bitrate selection models, comprising:

aggregating, by at least one computer processor, data associated with a data streaming session, wherein the data streaming session comprises a plurality of segments;

determining, for each segment of the plurality of segments, segment data comprising streaming parameters by analyzing the aggregated data, wherein the streaming parameters for each segment comprise a parameter associated with a buffer level immediately available for playback in a buffer of a media device;

generating a simulation input based on the segment data for each segment of the plurality of segments, wherein the simulation input comprises available bitrates for video or audio, a network bandwidth, and temporal information associated with each segment of the plurality of segments;

in response to the simulation input, performing a first simulation, based at least on the segment data for each segment of the plurality of segments and a first bitrate selection model, to simulate streaming each segment of the plurality of segments;

generating, based on the first simulation, a first simulation result for each segment of the plurality of segments, wherein each first simulation result comprises first simulation data for the streaming parameters of the respective segment of the plurality of segments, and aggregating each first simulation result, thereby providing a first aggregate simulation result of the data streaming session.

2. The computer-implemented method of claim 1, wherein the determining, for each segment of the plurality of segments, segment data comprises preprocessing the aggregated data.

3. The computer-implemented method of claim 1, further comprising:

in response to the simulation input, performing a second simulation, based at least on the segment data for each segment of the plurality of segments and a second bitrate selection model, to simulate streaming each segment of the plurality of segments, wherein the second bitrate selection model is different from the first bitrate selection model;

generating, based on the second simulation, a second simulation result for each segment of the plurality of segments, wherein the second simulation result comprises second simulation data for the streaming parameters of the respective segment of the plurality of segments;

aggregating each second simulation result, thereby providing a second aggregate simulation result of the data streaming session;

comparing the first aggregate simulation result and the second aggregate simulation result; and based on the comparison, selecting the first bitrate selection model to perform data streaming from a data streaming source.

4. The computer-implemented method of claim 1, wherein the performing the first simulation comprises refraining from performing data streaming or downloading.

5. The computer-implemented method of claim 1, wherein the performing the first simulation comprises:

providing the available bitrates for video or audio, the network bandwidth, and a streaming state associated with each segment of the plurality of segments to the first bitrate selection model; and selecting a video or audio bitrate by the first bitrate selection model for each segment of the plurality of segments.

6. The computer-implemented method of claim 1, wherein the performing the first simulation comprises:

monitoring the first simulation data for the streaming parameters during the first simulation.

7. A computing system for evaluating bitrate selection models, comprising:

one or more memories; and at least one processor, each coupled to at least one of the memories and configured to perform operations comprising:

aggregating data associated with a data streaming session, wherein the data streaming session comprises a plurality of segments;

determining, for each segment of the plurality of segments, segment data comprising streaming parameters by analyzing the aggregated data, wherein the streaming parameters for each segment comprise a parameter associated with a buffer level immediately available for playback in a buffer of a media device;

generating a simulation input based on the segment data for each segment of the plurality of segments, wherein the simulation input comprises available bitrates for video or audio, a network bandwidth, and temporal information associated with each segment of the plurality of segments;

in response to the simulation input, performing a first simulation, based at least on the segment data for each segment of the plurality of segments and a first bitrate selection model, to simulate streaming each segment of the plurality of segments;

generating, based on the first simulation, a first simulation result for each segment of the plurality of segments, wherein each first simulation result comprises first simulation data for the streaming parameters of the respective segment of the plurality of segments, and aggregating each first simulation result, thereby providing a first aggregate simulation result of the data streaming session.

8. The computing system of claim 7, wherein the operation of the determining, for each segment of the plurality of segments, segment data comprises preprocessing the aggregated data.

9. The computing system of claim 7, wherein the operations further comprise:

in response to the simulation input, performing a second simulation, based at least on the segment data for each segment of the plurality of segments and a second bitrate selection model, to simulate streaming each segment of the plurality of segments, wherein the second bitrate selection model is different from the first bitrate selection model;

generating, based on the second simulation, a second simulation result for each segment of the plurality of segments, wherein the second simulation result comprises second simulation data for the streaming parameters of the respective segment of the plurality of segments;

aggregating each second simulation result, thereby providing a second aggregate simulation result of the data streaming session;

comparing the first aggregate simulation result and the second aggregate simulation result; and based on the comparison, selecting the first bitrate selection model to perform data streaming from a data streaming source.

10. The computing system of claim 7, wherein the operation of the performing the first simulation comprises refraining from performing data streaming or downloading.

11. The computing system of claim 7, wherein the operation of the performing the first simulation comprises:

providing the available bitrates for video or audio, the network bandwidth, and a streaming state associated with each segment of the plurality of segments to the first bitrate selection model; and selecting a video or audio bitrate by the first bitrate selection model for each segment of the plurality of segments.

12. The computing system of claim 7, wherein the operation of the performing the first simulation comprises: monitoring the first simulation data for the streaming parameters during the first simulation.

13. A non-transitory computer-readable medium having instructions stored thereon that, when executed by at least one computing device, cause the at least one computing device to perform operations comprising:

aggregating data associated with a data streaming session, wherein the data streaming session comprises a plurality of segments;

determining, for each segment of the plurality of segments, segment data comprising streaming parameters by analyzing the aggregated data, wherein the streaming parameters for each segment comprise a parameter associated with a buffer level immediately available for playback in a buffer of a media device;

generating a simulation input based on the segment data for each segment of the plurality of segments, wherein the simulation input comprises available bitrates for video or audio, a network bandwidth, and temporal information associated with each segment of the plurality of segments;

in response to the simulation input, performing a first simulation, based at least on the segment data for each segment of the plurality of segments and a first bitrate selection model, to simulate streaming each segment of the plurality of segments;

generating, based on the first simulation, a first simulation result for each segment of the plurality of segments, wherein each first simulation result comprises first simulation data for the streaming parameters of the respective segment of the plurality of segments, and aggregating each first simulation result, thereby providing a first aggregate simulation result of the data streaming session.

14. The non-transitory computer-readable medium of claim 13, wherein the operation of the determining, for each segment of the plurality of segments, segment data comprises preprocessing the aggregated data.

15. The non-transitory computer-readable medium of claim 13, wherein the operations further comprise:

in response to the simulation input, performing a second simulation, based at least on the segment data for each segment of the plurality of segments and a second bitrate selection model, to simulate streaming each segment of the plurality of segments, wherein the second bitrate selection model is different from the first bitrate selection model;

generating, based on the second simulation, a second simulation result for each segment of the plurality of segments, wherein the second simulation result comprises second simulation data for the streaming parameters of the respective segment of the plurality of segments;

aggregating each second simulation result, thereby providing a second aggregate simulation result of the data streaming session;

comparing the first aggregate simulation result and the second aggregate simulation result; and based on the comparison, selecting the first bitrate selection model to perform data streaming from a data streaming source.

16. The non-transitory computer-readable medium of claim 13, wherein the operation of the performing the first simulation comprises refraining from performing data streaming or downloading.

17. The non-transitory computer-readable medium of claim 13, wherein the operation of the performing the first simulation comprises:

providing the available bitrates for video or audio, the network bandwidth, and a streaming state associated with each segment of the plurality of segments to the first bitrate selection model; and selecting a video or audio bitrate by the first bitrate selection model for each segment of the plurality of segments.

18. The computer-implemented method of claim 1, wherein the streaming parameters for each segment further comprise:

a parameter associated with an amount of memory available associated with the media device;

a parameter associated with a maximum display resolution on a display device associated with the media device; and a parameter associated with manifest bitrates in one or more manifest files associated with the data streaming session.

19. The computing system of claim 7, wherein the streaming parameters for each segment further comprise:

a parameter associated with an amount of memory available associated with the media device;

a parameter associated with a maximum display resolution on a display device associated with the media device; and a parameter associated with manifest bitrates in one or more manifest files associated with the data streaming session.

20. The non-transitory computer-readable medium of claim 13, wherein the streaming parameters for each segment further comprise:

a parameter associated with an amount of memory available associated with the media device;

a parameter associated with a maximum display resolution on a display device associated with the media device; and a parameter associated with manifest bitrates in one or more manifest files associated with the data streaming session.

* * * * *